United States Patent [19]

Fosberg et al.

[11] Patent Number: 5,246,542
[45] Date of Patent: Sep. 21, 1993

[54] EVAPORATION AND RECOVERY PROCESS FOR BLEACHED CHEMICAL THERMO-MECHANICAL PULP (BCTMP) EFFLUENT

[76] Inventors: Theodore M. Fosberg, 2841 SW. 172nd St., Seattle, Wash. 98166; Johan H. Jansen, 13615 NE. 48th Pl., Bellevue, Wash. 98005

[21] Appl. No.: 761,634

[22] Filed: Sep. 18, 1991

[51] Int. Cl.$^5$ .............................................. D21C 11/00
[52] U.S. Cl. ..................................... 162/29; 162/30.1; 162/31; 162/33; 162/38
[58] Field of Search ...................... 162/29, 30.1, 30.11, 162/31, 33, 35, 38; 210/928; 423/DIG. 3

[56] References Cited

U.S. PATENT DOCUMENTS

| | | | |
|---|---|---|---|
| 2,993,753 | 7/1961 | Collins, Jr. | 23/48 |
| 3,299,942 | 11/1967 | Jacoby | 423/DIG. 3 |
| 3,347,739 | 10/1967 | Tomlinson | 423/DIG. 3 |
| 3,561,922 | 2/1971 | Allen | 423/DIG. 3 |
| 3,574,051 | 4/1971 | Shah | 162/30 |
| 3,630,829 | 12/1971 | Caldwell | 162/30 |
| 3,650,888 | 3/1972 | Fogman et al. | 162/30.1 |
| 3,684,672 | 8/1972 | Iwahashi et al. | 162/29 |
| 3,694,307 | 9/1972 | Iwahashi | 162/30.1 |
| 3,830,688 | 8/1974 | Mannbro | 162/29 |
| 4,093,508 | 6/1978 | Henricson | 162/30 |
| 4,098,639 | 7/1978 | Noreus et al. | 162/30 |
| 4,131,508 | 12/1978 | Laakso | 162/30 |
| 4,212,702 | 7/1980 | Mizuguchi et al. | 162/36 |
| 4,288,286 | 9/1981 | Fuller | 162/30 |
| 4,299,652 | 11/1981 | Masuno et al. | 162/30 |
| 4,466,861 | 8/1984 | Hultman et al. | 162/38 |
| 4,529,479 | 7/1985 | Tuomi | 162/29 |
| 4,799,994 | 1/1989 | Rimpi | 162/29 |

Primary Examiner—W. Gary Jones
Assistant Examiner—Brenda Lamb
Attorney, Agent, or Firm—Bruce A. Kaser

[57] ABSTRACT

The invention disclosed here is a process or system for treating the effluent from a BCTMP pulp mill. The effluent is evaporated to produce a water condensate and a remaining waste product concentrate. The condensate is recycled for use in the BCTMP mill, or is dumped into the environment. The concentrate is incinerated in a recovery boiler. Incineration results in the recovery of certain reusable chemicals. At least some of such chemicals are fed back into the effluent while it is being evaporated, to buffer it, and thereby prevent the carryover of undesirable organic acids into the condensate. This ensures sufficient condensate purity for recycling it in the BCTMP process, or for otherwise dumping it into the environment.

7 Claims, 3 Drawing Sheets

EVAPORATION AND RECOVERY PROCESS FOR BLEACHED CHEMICAL THERMO-MECHANICAL PULP (BCTMP) EFFLUENT

TECHNICAL FIELD

The invention disclosed here generally relates to waste treatment methods, and more particularly, to the treatment and disposal of waste water effluent produced by pulp mills.

BACKGROUND INFORMATION

A person familiar with the wood pulp industry would know that there are different methods for making pulp from wood. Some pulp-making methods involve chemical processes or treatments that free pulp fibers from wood chips. Among these are the well-known Kraft and sulfite processes. Other methods utilize mechanical means for freeing the pulp fibers. These are commonly called groundwood processes. Still others involve a combination of mechanical and chemical processes, where the pulp fibers are primarily freed by mechanical means aided by chemical treatment. These are called "chemi-mechanical" processes.

The different pulp-making methods briefly described above each have their own advantages and disadvantages which need not be described here. However, their differences present variations in the efficiency of utilizing wood raw materials, and in the quality of pulp that is produced, the latter governing the suitability of the pulp for different uses. These same differences also present different environmental problems as to the disposal of their waste products.

The present invention is related to the disposal of waste products from pulp mills that fall within a general class known as TMP mills, which utilize "thermo-mechanical pulp-making" processes. The invention is more particularly related to CTMP or BCTMP mills, which are subclasses of the TMP class. As the skilled person would know, the CTMP and BCTMP acronyms stand for "chemical thermo-mechanical pulp-making" and "bleached chemical thermo-mechanical pulp-making", respectively.

Referring in particular to BCTMP mills, pulp is produced there in what is essentially a three-stage process. The first stage involves a pre-bleaching step; the second is a refining step; and the third is a final, bleaching step.

In the pre-bleaching step, wood chips are treated with a solution containing sodium hydroxide and hydrogen peroxide. The wood chips are then drained prior to refining. In the refining step, pulp fibers are freed by a mechanical grinding action that is done in the presence of a solution containing sodium hydroxide, sodium sulfite, and other chemicals including sodium silicate and certain wetting agents. After refining, the resultant pulp is then drained and washed. This is followed by the final, bleaching step, where the pulp is bleached in a solution of sodium hydroxide and hydrogen peroxide, followed by raining and washing the pulp one last time.

A pre-bleach liquor is produced after the wood chips are drained in the pre-bleach step; pulping liquor and wash are produced after the pulp is drained and washed in the refining step; and bleach liquor and wash water are produced after the pulp is drained and washed in the final bleaching step. These various liquors and wash make up the waste effluent that is discharged by the BCTMP mill. A typical BCTMP mill may produce approximately 2,200 gallons of such effluent every minute. Of this amount, organic and inorganic contaminants make up approximately 1% to 3% by weight. The rest is water.

The contaminants make the effluent unsafe for dumping into the environment without some form of prior treatment. Traditionally, BCTMP effluent has been biologically treated in large holding ponds or sloughs, where bacteria metabolize and decompose the organic contaminants over a period of time before further discharge into nearby lakes or rivers. Although the inorganic contaminants remain largely untreated by this method (approximately one-half of the contaminants are inorganic), it has been considered an environmentally sound form of treatment in most cases.

One drawback to biological treatment is that it requires that large quantities of water be available or located near the mill for discharge of the effluent. For this reason, it has been impractical to situate BCTMP mills in regions where there are no large lakes or rivers. A second drawback is that biological treatment produces large quantities of sludge, which creates a secondary disposal problem in and of itself.

As will become apparent, an object of the invention disclosed here is to free BCTMP mills from their past dependency on biological waste treatment, and/or to eliminate otherwise any mill dependency or requirement for large quantities of water for effluent discharge. Another object of the invention is to provide an improved or better form of waste water treatment.

The invention accomplishes this, in part, by utilizing evaporation technology to separate the water in the effluent from the contaminants, and by reusing or recycling the water back to the bleaching and washing portion of the BCTMP process. Although such technique sounds simple enough, its implementation creates other kinds of problems.

A first problem is that, when processing the rate of effluent flow described above via evaporation (approximately 2,200 gallons a minute), separating pure water from the contaminants results in a by-product of many tons per hour of concentrated waste or concentrate. Such waste also must be disposed of one way or another.

The present invention handles such waste by feeding it into a recovery boiler where it is incinerated. Not only does this provide the advantage of a clean form of solid waste disposal, but it also provides a source of steam that can be used elsewhere in the mill.

Incineration in a recovery boiler also enables recovery of valuable inorganic chemicals that are reusable, in the BCTMP mill, or in other mills, and is especially well-suited for reuse in Kraft mills. These advantages notwithstanding, a recovery boiler has its own unique requirements that create another problem directly affecting evaporation of the effluent.

In order to efficiently burn the concentrate, it is desirable that the effluent first be concentrated to a very high level so that it can independently support combustion. As a practical matter, the waste should be concentrated to approximately 65% to 70% solid matter by weight. Unfortunately, this concentration requirement affects the quality or purity of the water evaporated from the effluent.

Evaporation and subsequent condensation is typically accomplished in stages, where the effluent is passed from one evaporator to another, with the level of waste in the concentrate increasing through the stages. A person familiar with BCTMP mills would know that the early evaporate from each evaporator is impure, because it contains methanol. This is removed by stripping, which is a standard process that is well-known. However, the purity of the condensate produced, even after methanol removal, will decline further as the effluent's concentration increases above a certain level.

In particular, the condensate becomes contaminated by excessively high carryover of certain volatile organics present in the effluent, the most notable of which is acetic acid. If, for example, the level of acetic acid in the condensate becomes too high, then the condensate becomes chemically unacceptable for reuse in the BCTMP process. It also may not be acceptable, or safe, otherwise for dumping directly into the environment, if that is desired.

As will become apparent, the present invention provides a unique resolution to the above situation, where a solution to a given problem creates another problem of a different kind. That is to say, the invention provides a way to evaporate BCTMP effluent until it reaches a waste concentration level that will support combustion in a recovery boiler, while, at the same time, it controls the quality of the water evaporated from the effluent so that it may be reused. How the invention accomplishes this is described below.

SUMMARY OF THE INVENTION

The invention is best characterized as a process involving evaporation of the effluent from a BCTMP pulping process, with recovery and reuse of the water evaporated, followed by combustion or incineration of the concentrated waste products remaining after evaporation. Chemicals recovered after incineration are recycled or fed back into the effluent during evaporation. They consequently control the quality of the resultant condensate as the waste products are evaporated to the high concentration levels required to support combustion.

As described above, the effluent is mostly water, but carries and is contaminated by certain organic and inorganic waste materials. Evaporation of the effluent produces a water condensate or reliquified water vapor. What remains after evaporation is a concentrated effluent, or waste product concentrate. The concentration of the organic and inorganic waste materials in the effluent increases as more and more water is evaporated from it. Except for methanol, which is removable as foul condensate, and the volatile organic carryover condition discussed in the background portion of this disclosure, the resulting condensate is nearly pure water.

Once the concentrate has achieved a high level of organic and inorganic waste by weight, it is incinerated or combusted in a recovery boiler. If sufficiently concentrated, no additional fuels are required to maintain ongoing combustion. That is, the waste materials by themselves will have a heating value sufficiently high enough to independently support combustion.

Certain reusable chemicals result or are recoverable from combustion of the concentrate in the recovery boiler. These chemicals are mainly sodium carbonate, with smaller amounts of other chemicals that will be described later. In the pulp making industry, sodium carbonate from a recovery boiler, after being dissolved in water, is commonly known as "green liquor".

In accordance with the invention, at least some green liquor produced from the recovered chemicals is recycled back into the BCTMP effluent while it is being evaporated. This buffers and raises the effluent's pH, and fixes the volatile organic acids in the waste product concentrate as its concentration increases to the high levels required to support combustion. The result is that undesirable organic acid carryover into the condensate is eliminated, which ensures that the condensate will be sufficiently pure for reuse in the BCTMP process, or otherwise environmentally safe for dumping without further processing.

The invention as summarized above, including possible variations of the invention, will become more fully understood upon consideration of the following description which is to be taken in conjunction with the drawings.

BRIEF DESCRIPTION OF THE DRAWINGS

In the drawings, like reference numerals and letters refer to like parts throughout the various views, and wherein.

BEST MODE FOR CARRYING OUT THE INVENTION

Figure 1:
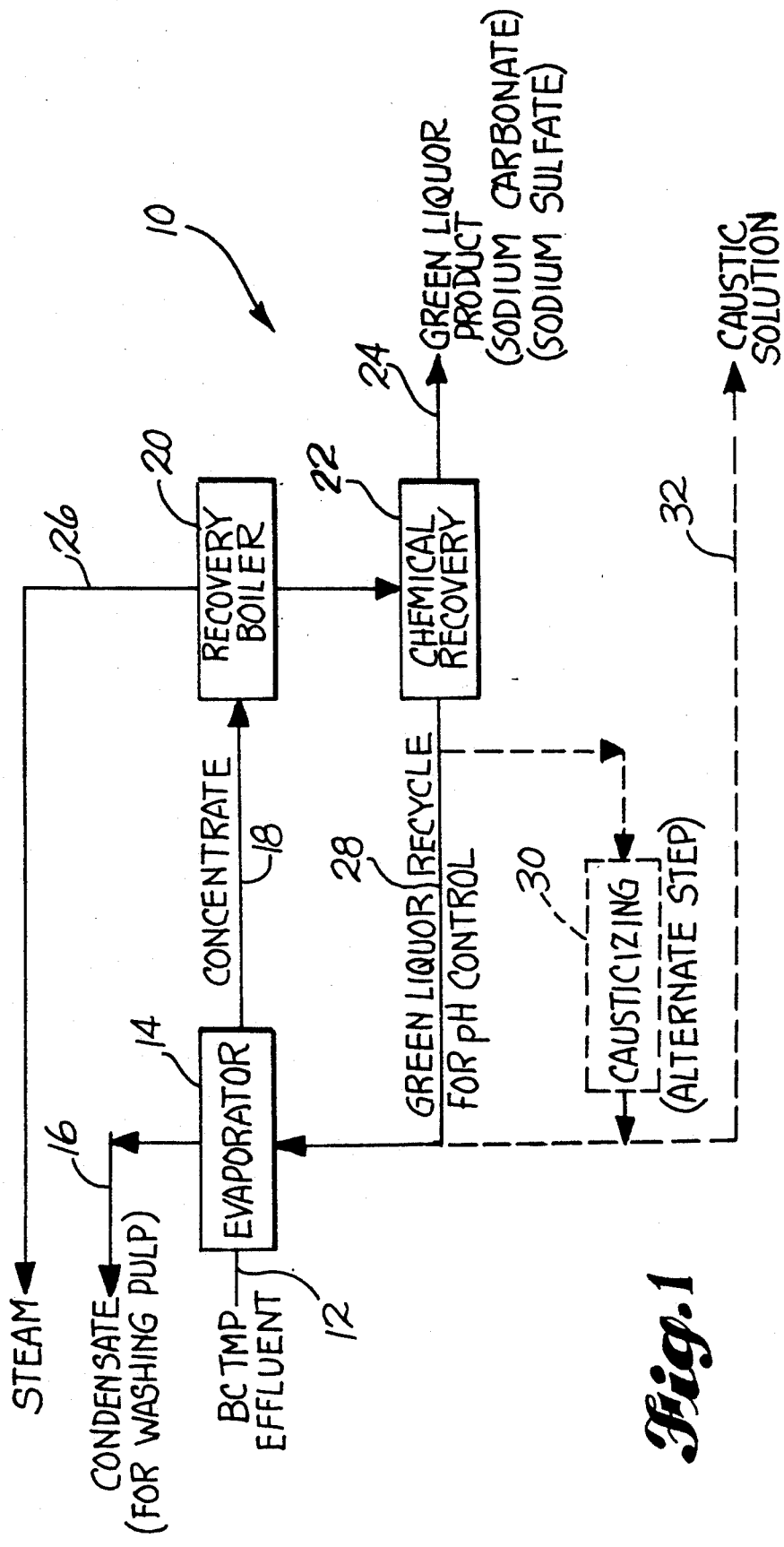
FIG. 1 is a schematic block diagram illustrating a process or method for treating BCTMP effluent in accordance with the invention.

Referring now to the drawings, and first to FIG. 1, therein is shown generally at 10 an integrated process or system for treating BCTMP effluent. A person skilled in the art would be very familiar with BCTMP mills, and would know how pulp is made in such mills. Consequently, there is no need to present here any further detailed description of the operation of such mills, other than what has already been presented.

In accordance with the invention, the effluent 12 from a BCTMP mill is first subjected to evaporation in an evaporator or multiple evaporator system 14, which is described in greater detail below. Generally speaking, the evaporator system 14 concentrates the effluent 12 by evaporating and condensing water therefrom. This provides or produces an essentially clean condensate 16, which is preferably recycled back to the BCTMP mill for use in pulp making, or otherwise disposed of by dumping into the environment. In the latter instance, there would be no detrimental environmental effects since the condensate 16 is essentially clean water.

The concentrated effluent or waste product concentrate 18 is combusted in a recovery boiler system 20, which is also described in greater detail below. In general, the boiler 20 incinerates the organic waste materials in the concentrate 18, and reduces certain desirable inorganic chemicals in the waste to recoverable smelt and ash, as shown at 22. The smelt and ash are mostly sodium carbonate, with a small amount of sodium sulfate, and nearly negligible amounts of sodium sulfite and sodium chloride. The combustion process in the recovery boiler 20 also produces steam 26 which may be used in the BCTMP mill.

As the skilled person would know, dissolving sodium carbonate into water, or otherwise dissolving the recoverable smelt and ash described above, produces a solution that is commonly known as "green liquor", which is schematically indicated at 24 in FIG. 1. In accordance with the invention, the ash and smelt recovered in the boiler is dissolved to produce such liquor, at least some of which is fed back to the evaporator system 14, as shown at 28, and added to the effluent 12 while it undergoes evaporation.

The green liquor 28 controls the pH of the evaporating effluent and buffers it, which substantially reduces or nearly eliminates the amount of organic acid carry-over into the condensate 16 as the concentration of the effluent 12 reaches high levels.

As an alternative, at least some of the green liquor 28 may be causticized, as indicated at 30. Basically, and as the skilled person would know, this involves making a caustic solution consisting mainly of sodium hydroxide from the chemicals recovered from the boiler 20. If desired, the caustic 30 could be used in the same manner as the green liquor 28 for buffering the effluent 12. Any green liquor or caustic not recycled to the evaporator system 14 may be stored and/or sold to other plants that use such chemicals, as indicated at 24, 32. The caustic may also be reused in the BCTMP mill.

Figure 2:
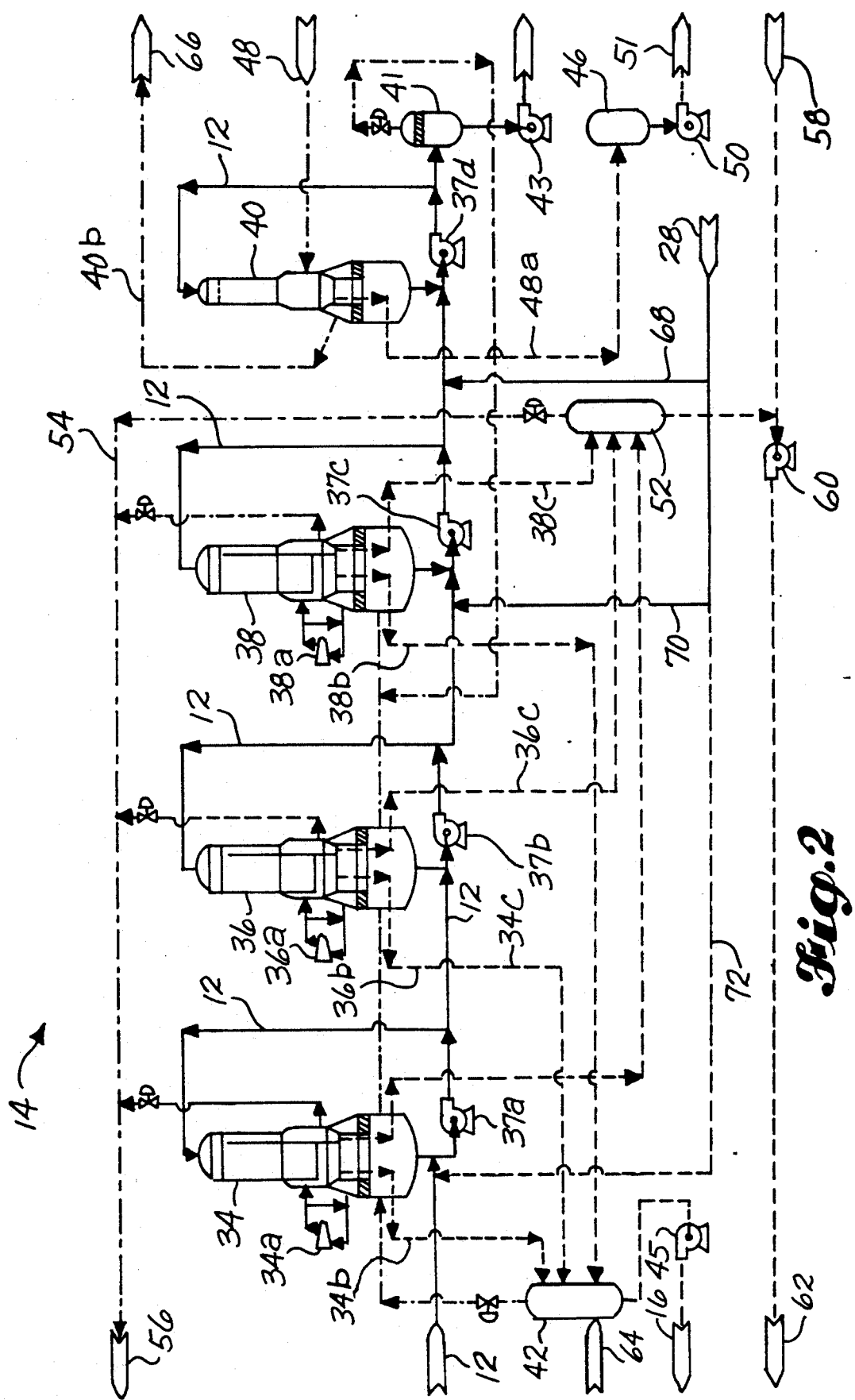
FIG. 2 is a schematic diagram that illustrates use of an evaporator system as part of the process shown in FIG. 1.
Figure 3:
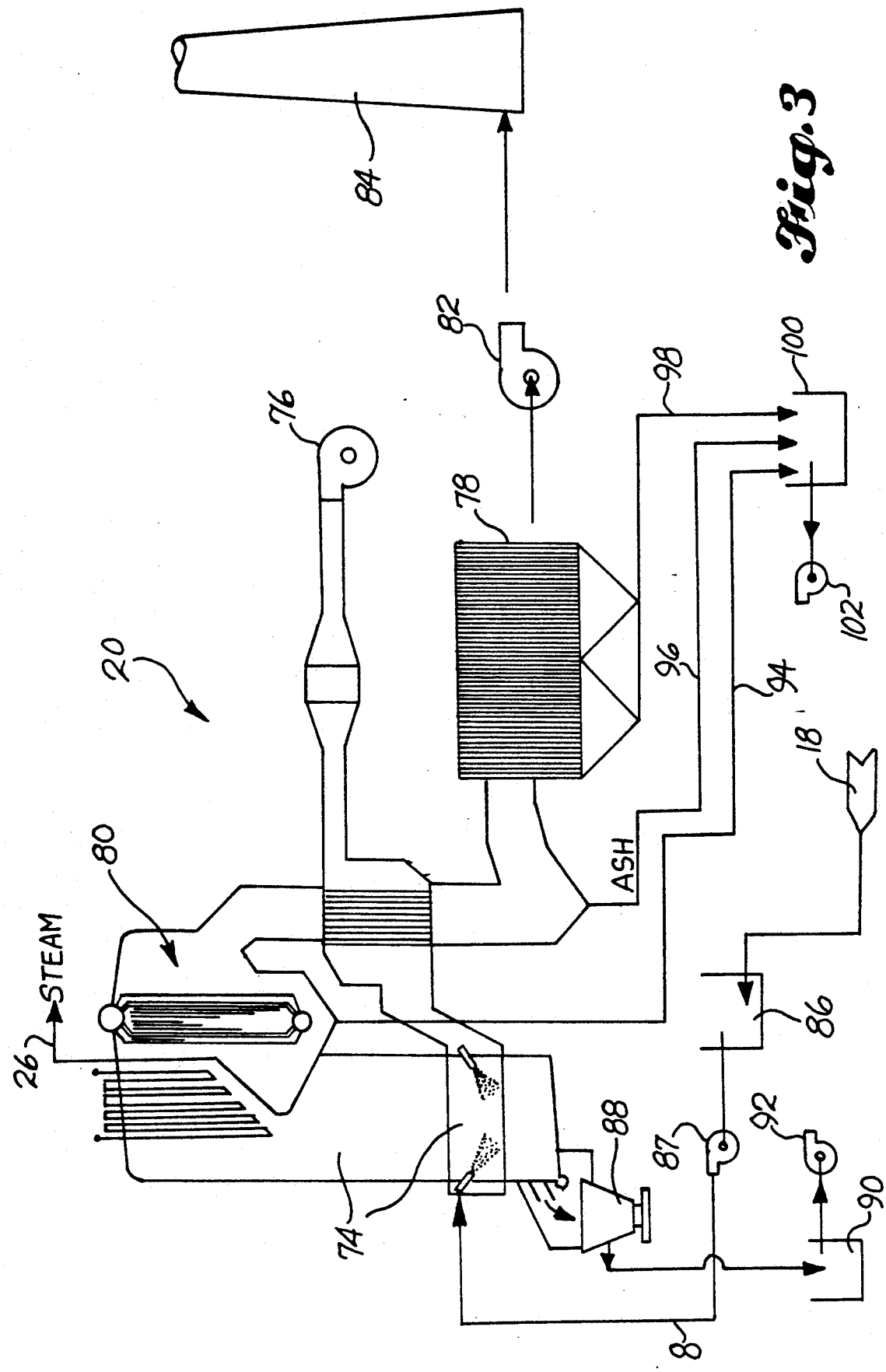
FIG. 3 is a schematic diagram that illustrates use of a recovery boiler system as part of the process shown in FIG. 1.

Having made the above general description of the system 10 with reference to FIG. 1, a more detailed description of the evaporator and recovery boiler systems 14, 20 follows, and attention is now directed to FIGS. 2 and 3. The evaporator system 14 shown in FIG. 2 is a typical multiple-step system that otherwise has been modified to implement the invention. The skilled person would realize that other evaporator configurations or systems may work just as well. The recovery boiler system 20 shown in FIG. 3 is also typical, although, as the skilled person would know, such systems can vary slightly from one configuration to the next.

Referring first to FIG. 2, and by way of illustrative example, the evaporator system 14 may include four separate evaporators 34, 36, 38, 40 although the exact number could be greater or lesser, depending on the efficiency desired for a given BCTMP mill. The first three evaporators 34, 36, 38 are pre-evaporators that have mechanical vapor compressors 34a, 36a, 38a. These compressors 34a, 36a, 38a provide the energy for evaporation. As the skilled person would know, it may be more usual in typical multi-step evaporator systems to drive individual evaporators by steam. Mechanical compressors are less common, but are nevertheless well-suited for the evaporator system 14 disclosed here. However, whether the pre-evaporators 34, 36, 38 are driven mechanically, or by steam, has little bearing on what is considered to be the invention here.

The fourth evaporator 40 is a concentrator that is driven by plant steam 48. It operates to evaporate the effluent 12 to higher concentration levels. Like the pre-evaporators 34, 36, 38, the operation of the concentrator 40 would also be familiar to the skilled person.

Upon review of FIG. 2, the skilled person would realize that the effluent 12 from the BCTMP mill is first processed by one evaporator, and then another, and the effluent's waste product concentration level rises after each evaporative step. Each evaporator 34, 36, 38, 40 concentrates the effluent 12 by vaporizing it, which produces an evaporate that is later condensed. Such condensate is, of course, higher in quality than the effluent prior to evaporation, because the waste materials remain in the concentrated effluent.

As mentioned above, the BCTMP effluent 12 can contain approximately 1% to 3% waste materials by weight when it is fed into the evaporator system 14. A plurality of pumps 37a, 37b, 37c, 37d move the effluent 12 through the various evaporative steps represented by the pre-evaporators 34, 36, 38, and the concentrator 40.

The pre-evaporators 34, 36, 38 preferably operate to concentrate the effluent to approximately 35% solid waste. The concentrator 40 preferably concentrates the effluent to approximately 65% to 75%, which is probably required in order to support combustion in the recovery boiler 20.

The final concentrate may be flashed, in a product flash tank 41, and pumped to the recovery boiler 20, as shown at 43. It should be noted that reference numeral 18 in FIG. 2 corresponds to the same reference numeral at the input to the recovery boiler 20 shown in FIG. 3. It is likely that an intermediate storage facility should be located between the evaporator system 14 and recovery boiler 20, where the final concentrate is temporarily stored prior to incineration. This is shown at 86 in FIG. 3.

As shown at 34b, 36b, 38b, clean condensate from the effluent 12 is drawn from each pre-evaporator 34, 36, 38. This condensate 34b, 36b, 38b is stored in a condensate tank 42 for reuse in the BCTMP mill. Removal of the clean condensate from tank 42 is accomplished by a conventional pump 45.

The concentrator 40 is steam driven by plant or prime steam 48. The concentrator 40 produces an evaporate 40b from the effluent 12. As is schematically shown at 66, the evaporate 40b is condensed and then, for reasons discussed below, stripped in a foul condensate stripper. After condensation and stripping, the condensate from evaporate 40b is reused in the BCTMP mill or is otherwise dumped.

Prime condensate 48a is also drawn from the concentrator 40. This is condensate resulting from condensation of the plant steam 48 that is run through the concentrator 40. As such, it is clean, and is stored in a tank 46. A pump 50 returns the prime condensate 48a back to the BCTMP process, which is schematically indicated at 51, where it is used as needed. Preferably, the prime condensate 48a is used to make more prime steam 48 for the concentrator 40.

As the skilled person would know, the pre-evaporators 34, 36, 38 produce both clean and foul condensate. The foul condensate is foul because it contains methanol. It is drawn separately from each pre-evaporator as shown at 34c, 36c, 38c, and is delivered to a foul condensate tank 52. A small portion of such condensate can be vented as shown at 54 and 56 to a conventional vent condenser (not shown).

Reference numeral 58 in FIG. 2 indicates foul condensate that is returned from the vent condenser. Such condensate is combined with the major portion of the foul condensate from tank 52, and then is pumped to a stripper by a pump 60. Like the vent condenser just mentioned, the stripper is not shown in the drawings, as it is a conventional item that would be well-known to the skilled person. The feeding of the foul condensate to the stripper is schematically indicated at 62. After the foul condensate is stripped, it can be delivered to the clean condensate tank 42, as is schematically indicated at 64, for reuse in the BCTMP process.

The vapor or evaporate 40b from the concentrator 40 will also contain certain levels of methanol. As such, the evaporate 40b is similarly subject to a foul condensate stripping process prior to reuse in the BCTMP process.

It should be mentioned at this point that, depending on the concentration level of the effluent 12, foul condensate produced by the evaporator system 14 may also contain excessively high levels of acetic acid carryover, unless the effluent is otherwise buffered in accordance with the invention. Therefore, buffering the effluent reduces acetic acid carryover in both clean condensate and foul condensate that is later stripped and reused.

The effluent 12 typically has a pH on the order of 8 to 9 when it is delivered to the pre-evaporators 34, 36, 38. Green liquor 28 is preferably recycled or added to the effluent 12 in the evaporator system 14 when the concentration of the effluent reaches a level of approximately 35% waste products by weight. With respect to the evaporator system 14 shown in FIG. 2, it is therefore likely that the green liquor 28 should be added prior to the concentrator stage, as shown at 68. Addition of the liquor 28 increases the effluent's pH to approximately 10 or 11.

Table I below illustrates typical evaporator test results showing how the above-described pH control of the effluent or concentrate can affect acetic acid carryover. The test results shown in Table I are from a single-pilot evaporator which was operated to simulate the process conditions in the system 14 shown in FIG. 2.

(or evaporate) 38b, 38c, 40b produced by evaporator 38 and the concentrator 40, requiring addition of the green liquor 28 prior to those stages, as shown at 68, 70. If future development of the invention indicates otherwise, green liquor 28 could be recycled into earlier steps of the evaporative process, as shown by dashed line 72 in FIG. 2, with little modification to the evaporator system 14.

FIG. 3 schematically illustrates the recovery boiler and chemical recovery system 20, 22 of FIG. 1 in greater detail. The basic construction and operation of a recovery boiler is well known by those skilled in the art and need not be described in great detail here, other than what is necessary to understand the present invention.

Briefly, like all known recovery boiler systems, the system 20 has a furnace chamber or incinerator 74 in which the concentrate 18 is burned. A forced draft fan 76 delivers combustion air into the furnace for incineration purposes. The recovery boiler 20 also has a precipitator 78 through which the boiler's flue gases 80 are processed prior to delivery to the boiler's stack 84 by an inducted draft fan 82.

Concentrate 18 from the evaporator system 14 is pumped from a holding tank 86, as shown at 87, and is fed into the boiler's combustion chamber 74 via conventional liquor guns. The organic and inorganic materials

TABLE I

BCTMP WASTE WATER EFFLUENT EVAPORATION
TYPICAL PILOT EVAPORATOR TEST RESULTS
EFFECTS OF pH CONTROL ON CONDENSATE QUALITY

| Evaporator Test | TDS, mg/l | | Evaporator Feed | pH | | Acetic Acid in Condensate, mg/l | Remarks |
|---|---|---|---|---|---|---|---|
| | Evaporator Feed | Concentrate | | Concentrate | Condensate | | |
| 1 | 2.5 | 4.6 | 8.8 | 9.5 | 4.9 | 1.1 | |
| 2 | 4.2 | 11.0 | 9.12 | 9.32 | 6.0 | 4.8 | |
| 3A | 8.6 | 35.0 | 9.12 | 9.77 | 4.93 | 50.3 | |
| 3B | 8.7 | 37.0 | 10.45 | 11.08 | 5.41 | 6.7 | Sodium carbonate solution added for pH control. |
| 4A | 31.0 | 51.0 | 9.49 | 10.14 | 5.61 | 54.6 | |
| 4B | 37.0 | 62.0 | 10.98 | 10.88 | 7.46 | 16.7 | Sodium carbonate solution added for pH control. |

Evaporator Tests 3A and 3B above, and Tests 4A and 4B, illustrate how the pH of the concentrate affects acetic acid carryover. In Test 3A, for example, the concentrate was at a concentration level of approximately 35%, and had a pH level of 9.77. The acetic acid carryover from such concentrate was approximately 50 milligrams per liter. Test 3B shows a concentrate having approximately the same concentration level (37%), but the pH was increased to 11.08 by the addition of a sodium carbonate solution, the latter being equivalent to green liquor. There, the acetic acid carryover level in the condensate was reduced to 6.7 milligrams per liter. The same differences can be seen by comparing Tests 4A and 4B. It should also be noted that Pilot Evaporator Tests 1 and 2 verify that acetic acid carryover is minimal for low concentration levels of the concentrate, which would be the case for the effluent 12 as it is processed by the pre-evaporators 34, 36.

In accordance with the invention, the pre-evaporators 34, 36 preferably operate to concentrate the effluent 12 to less than 10%. As reflected by the test results of Table I, there should be little acetic acid carryover in both the clean and foul condensate 42, 52 produced by them. Carryover may become a problem in the vapor in the concentrate 18 include various compounds that contain fairly high levels of carbon, sodium and oxygen, and smaller levels of hydrogen, sulfur, potassium, chlorine and bromine.

The products of combusting the concentrate 18 in the furnace 74 are smelt, ash and gas. The smelt, which is mostly sodium carbonate, is collected via a conventional smelt removal system 88 (smelt produced from the waste concentrate 18 will contain the following chemicals in approximate amounts: 92.6% $Na_2CO_3$; 6.0% $Na_2SO_4$; 0.4% $Na_2S_2O_3$; and 1.0% NaCl). The smelt is thereafter dissolved (approximately 110 grams per liter) in a tank 90 to produce green liquor. The liquor is pumped, as shown at 92, back to the evaporator system 14 (see input 28 in FIG. 2), or is otherwise pumped to storage locations elsewhere.

Ash from the combustion process may be collected at certain locations along the path of flue gas travel to the precipitator 78, or from the precipitator itself, as indicated respectively at 94, 96, 98. The chemical content of the ash is similar to the smelt, and like the smelt, it may be dissolved in a tank 100 to produce green liquor. This may also be pumped, as indicated at 102, back to the evaporator system 14, or to a storage location elsewhere.

In summary, the system 10 preferably recycles nearly all of the effluent's water, and otherwise completely disposes of the effluent's solid waste. Any water that is not recycled can be safely dumped. Recycling the water eliminates the past requirement that BCTMP mills be located near large bodies of water. Freeing BCTMP mills from this requirement means that they can be more easily located near the source of wood raw materials required for making pulp.

Of the organic and inorganic contaminants present in the effluent, what is not cleanly burned is recycled. In this way, a BCTMP process can be made to operate without creating waste that significantly impacts the environment.

It should be understood that the preceding description describes the best mode for carrying out the invention as it is presently known. It is conceivable, and indeed, it may be likely that the system 10 just described may later be changed in many ways upon making further related developments and/or discoveries. It is also possible that the system 10 may be found to have utility in pulp mills other than a BCTMP mill. For this reason, the preceding description of the evaporation and recovery boiler systems 14, 20 should not be taken in a limiting sense, nor should such description be deemed to define the metes and bounds of what is sought to be patented here. Instead, the spirit and scope of what is patentable is defined in the patent claim or claims which follow. Any and all determinations of the patent rights granted by this document are to be made solely and exclusively by interpreting such claims in accordance with the well-established doctrines of patent claim interpretation.

What is claimed is:

1. A process for treating a waste effluent discharged from a bleached chemical thermo-mechanical pulpmaking (BCTMP) process by producing water that is sufficiently clean for reuse in the BCTMP process or otherwise safe for dumping into an ambient environment, the effluent as discharged from the BCTMP process being mostly water but carrying a low concentration of organic and inorganic waste, including acetic acid, such waste making up approximately 1 percent to 3 percent of the effluent by weight, the treatment process comprising at least the following steps:

evaporating the effluent until its waste concentration is sufficiently high to support combustion, including producing a water condensate from the vapor of the evaporating effluent; followed by combusting the effluent, and recovering smelt from the combusted effluent, the smelt being characterized in that it is dissolvable into water to produce a solution having a pH that is at least as high as at 10; and recycling at least some of the smelt back into the evaporating effluent for raising effluent pH to 10 and thereby buffering the acetic acid carried by the effluent, such buffering causing a reduction in an amount of acetic acid carryover into the water condensate.

2. The treatment process of claim 1, wherein evaporating the effluent further includes subjecting the effluent to sequential multiple steps of evaporation, each step producing at least some water condensate and increasing the waste concentration of the effluent; and combusting the effluent further includes burning the concentrated effluent in a recovery boiler, and recovering smelt from the boiler; and recycling at least some of the smelt back into the evaporating effluent further includes first dissolving the smelt into water and thereby creating green liquor, followed by adding at least some of the green liquor to the effluent prior to at least one of the multiple steps of evaporation.

3. The treatment process of claim 2, including using a separate evaporator for each one of the multiple steps of evaporation, all of the evaporators being serially connected, the last evaporator in the series being a steam-driven concentrator evaporator, and wherein the green liquor is added to the evaporating effluent immediately prior to entry of the effluent into the last evaporator.

4. The treatment process of claim 2, wherein evaporating the effluent until its waste concentration is sufficiently high to support combustion includes evaporating the effluent until the waste makes up at least 65 percent of the effluent by weight.

5. The treatment process of claim 1, further including reusing the condensate as clean water for making pulp in the BCTMP process.

6. The treatment process of claim 1, wherein evaporating the effluent further includes subjecting the effluent to sequential multiple steps of evaporation, each step producing at least some water condensate and increasing the waste concentration of the effluent; and combusting the effluent further includes burning the concentrated effluent in a recovery boiler, and recovering the smelt from the boiler; and recycling at least some of the smelt back into the evaporating effluent further includes causticizing the smelt and producing a caustic solution, followed by adding at least some of the caustic solution to the effluent prior to at least one of the multiple steps of evaporation.

7. The treatment process of claim 6, including using a separate evaporator for each one of the multiple steps of evaporation, all of the evaporators being serially connected, the last evaporator in the series being a steam-driven concentrator evaporator, and wherein the green liquor is added to the evaporating effluent immediately prior to entry of the effluent into the last evaporator.

* * * * *